Oct. 8, 1940.    G. P. McGRAW    2,217,345
SPRAY BOOTH
Filed Dec. 30, 1938    2 Sheets-Sheet 1

INVENTOR
G. P. McGRAW
BY Emery Robinson
ATTORNEY

Patented Oct. 8, 1940

2,217,345

UNITED STATES PATENT OFFICE 2,217,345

SPRAY BOOTH

George P. McGraw, Downers Grove, Ill., assignor to Western Electric Company, Incorporated, New York, N. Y., a corporation of New York Application December 30, 1938, Serial No. 248,425

8 Claims. (Cl. 91—60)

This invention relates to spray booths, and more particularly to booths or cabinets for use in applying paint, lacquer and the like on articles by a spray coating process.

In spray coating processes only a portion of the coating material engages the article being coated, and it is desirable to accumulate the excess material in some readily disposable form. This has been done by conducting the spraying operation in a walled enclosure and periodically removing or cleaning the accumulated coating material from the walls of the enclosure. However, the cleaning procedure is often difficult and expensive and in some cases, where the paint or lacquer contains an inflammable solvent, the wall deposits present a possible fire hazard.

An object of this invention is the provision of a spray booth constructed to dispose of excess coating material continuously, efficiently and safely.

One embodiment of the invention is adapted to an open front booth or cabinet having a roof, two side walls, a rear wall, and a floor which slopes from the open front of the booth to the rear wall. Extending along the top of the side and rear walls is a perforated pipe connected to a water source for supplying a continuous curtain of water on these walls. Along the bottom of each side wall is an open top receptacle or gutter for collecting water flowing over the wall and discharging the water into a trough extending across the front of the booth at the floor line. The water then is distributed uniformly across the floor front by means of spaced notches in the inner wall of the trough and flows down the sloping floor to an opening in the rear wall. This construction provides a moving curtain of water on the side walls, rear wall and floor of the booth for continuously intercepting and removing the excess coating material.

Figure 1:
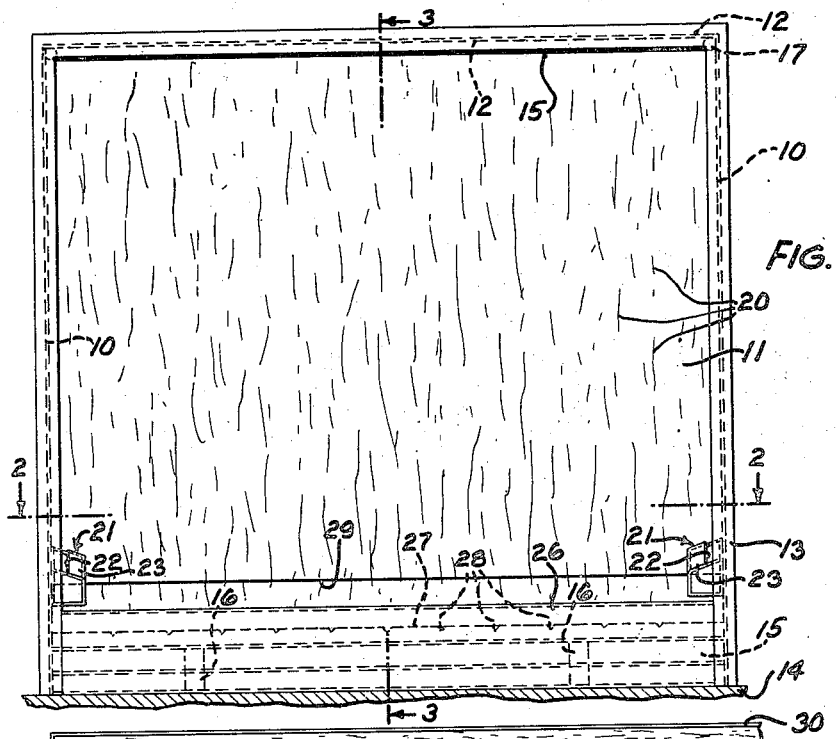
Figure 2:
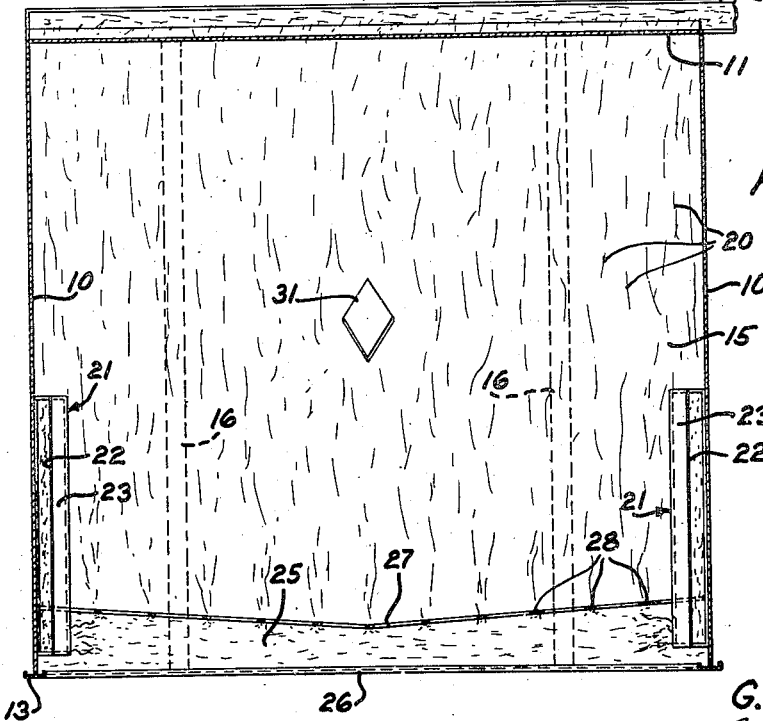
Figure 3:
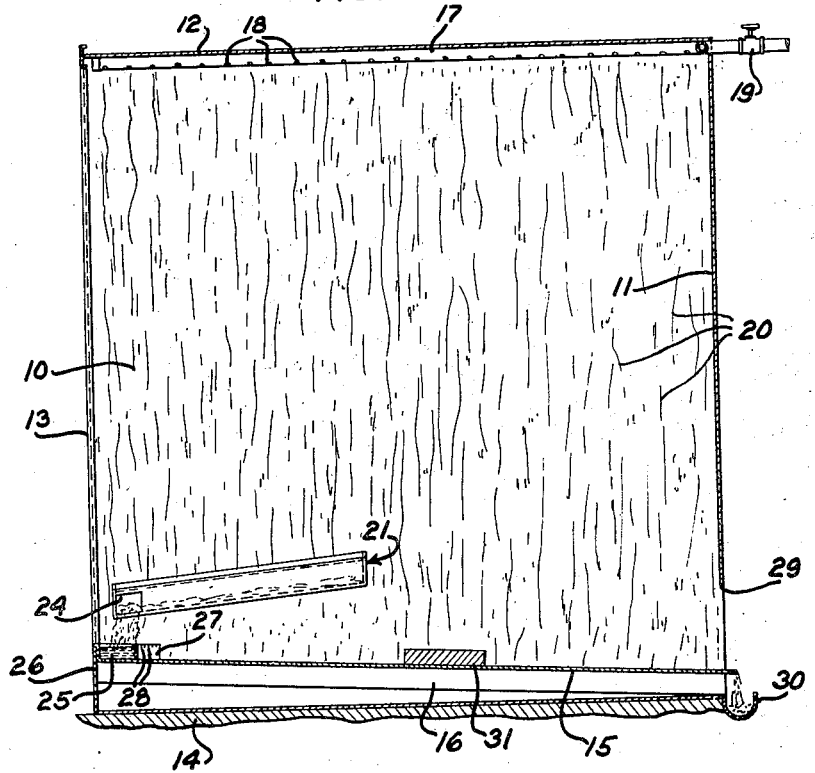

Following is a more complete description of the invention taken in conjunction with the appended drawings, in which Fig. 1 is a front elevation, partly in section, of a spray booth embodying certain features of the invention;

Fig. 2 is a sectional view of the booth shown in Fig. 1 taken on the line 2—2, and Fig. 3 is a sectional view of Fig. 1, taken on the line 3—3.

The open-front booth to which this invention is adapted may be rectangular in shape with side walls 10, a back wall 11, and a top 12, conveniently formed from sheet metal and joined by any suitable means such as welding or riveting. A strengthening frame 13 of structural members, such as angles or channels, may be employed and the booth mounted on a shop bench 14 or floor, depending upon the size of the installation.

A booth floor 15, also of sheet metal, is positioned above the bench and slopes downwardly from the open front of the booth to the rear wall. The floor is mounted on longitudinal members 16 or channels and is secured to the walls at its periphery, preferably by means of welding, to provide a water tight joint between the floor and walls.

Extending along the full length of the side and back walls and positioned just under the roof of the booth is a pipe 17 with spaced perforations 18 therein. The pipe is connected to a water main (not shown) under control of a manual valve 19 in the pipe line. Water 20 introduced to the pipe issues from the perforations and flows down the side and back walls in a continuous moving curtain.

Secured to the bottom front portion of each side wall is a gutter 21 or receptacle for intercepting a portion of the water falling over the respective wall. The gutters are made of sheet metal formed into a receptacle with a longitudinal opening 22 adjacent to the wall for entry of the water and a portion 23 of the top enclosed to prevent splashing. The gutters terminate near the front edge of the wall and extend along the wall for a distance depending upon the dimensions of the booth. Each gutter slopes toward the front of the booth so that water accumulated therein flows from a gutter outlet 24 at the booth front into an adjacent open trough 25 extending across the booth floor.

The trough is constructed to discharge the water uniformly over the full extent of the floor at the front of the booth. An outer wall 26 of the trough is straight and relatively high so that no water can escape onto the booth support. The inside wall 27 of the trough tapers with reference to the outer wall from each end of the trough so that the trough narrows progressively from its ends, where the water is received, to its middle portion. The top edge of the inside wall, which is lower than the top edge of the outer wall, has a series of spaced notches 28 therein, through which the water is discharged onto the floor.

The spacing of the notches and variation in the cross-section of the trough cause a uniform discharge of water over the extent of the booth floor so that the water flows in a continuous sheet down the sloping floor and through an opening 29 in the back wall at the floor line into a drain 30.

The drain is mounted along the back of the booth below the floor line and the end of the floor extends partially over the drain.

Water from the back wall of the booth is discharged directly into the drain. The rear portions of the side walls are not provided with gutters and the water from these wall portions flows onto the sloping floor, through the wall opening and into the drain. The length of the gutters depends upon the quantity of water required for the floor and is, therefore, determined by the dimensions of the booth. In representative installations, gutters extending about one-fourth of the wall length were found to be satisfactory.

With the described construction, a moving curtain of water is provided and maintained on the back wall, side walls and floor of the booth when the water control valve is open. During the spraying operation the article to be coated is placed on a suitable pedestal mounted on a turntable 31 on the booth floor. Any excess spraying material not engaging the article is immediately encountered and removed from the booth by the moving curtains of water and conducted to a sewer or to a suitable apparatus for recovery of the coating material. By continuously removing the coating material from the booth, as described, the necessity for periodical cleaning operations is avoided and the fire hazard due to accumulation of combustible materials is eliminated.

It will be apparent that modifications of the construction specifically described herein are feasible, and it is to be understood that the invention is limited only by the scope of the following claims.

What is claimed is:

1. In a spray booth having walls and a sloping floor, means for continuously supplying water to the top portions of said walls, means for collecting a portion of the water at the bottom portions of said walls, and means at the high end of the sloping floor for distributing the collected water over one end of the sloping floor.

2. In a spray booth of the open front type, side walls, a back wall, a floor sloping towards the back wall, means for supplying a curtain of moving water on said side and back walls, a gutter mounted on a side wall for collecting a portion of the falling water, and a trough extending across the front of the floor for receiving the water from the gutter and discharging the collected water at the front of the sloping floor.

3. In a spray booth of the open front type having side walls, a back wall and a floor sloping towards the back wall, a perforated pipe extending along the top of the side and back walls, means for supplying water to said pipe, an open top receptacle on the bottom of said side walls for intercepting water discharged from said pipe, and means for distributing the intercepted water uniformly across the floor at the front of the booth whereby a blanket of moving water is provided over the floor as the water flows down the sloping floor towards the back wall.

4. In a spray booth of the open front type, a pair of side walls, a back wall, a floor sloping towards the back wall, means for supplying a curtain of moving water on said walls, a receptacle for collecting water flowing over the walls, and a second receptacle for receiving the water from the first receptacle and distributing the water uniformly along the floor at the front of the booth to provide a blanket of moving water over the floor as the water flows down the sloping floor to the back wall.

5. In a spray booth of the open front type having side walls, a back wall and a floor, a perforated pipe extending along the top of the side and back walls, means for supplying water to said pipe for providing a curtain of moving water on said walls, an open top receptacle mounted on the bottom portion of each side wall for collecting water flowing over the respective wall, and a trough extending across the front of the floor, said trough being adapted to receive the water from the wall receptacles and distribute the collected water uniformly along the floor at the front of the booth.

6. In a spray painting booth of the open front type having side walls, a back wall and a floor sloping towards the back wall, means for supplying a continuous curtain of moving water on said walls, a gutter mounted along the bottom of each side wall for intercepting a portion of the water flowing over the respective wall, said gutters having an outlet near the front of the booth, and a trough extending across the front of the floor and positioned to receive water flowing from the gutter outlets, said trough comprising an outer wall extending across the front of the booth, and an inner wall having a series of spaced notches in its top surface for releasing the collected water uniformly along the floor at the front of the booth.

7. In a spray booth of the open front type, side walls, a back wall, a floor sloping towards the back wall, a perforated pipe extending along the top of the side and back walls, means for supplying water to said pipe for providing a curtain of moving water on said walls, a gutter mounted along a portion of the bottom of each side wall adjacent to the front of the booth for intercepting water flowing over the respective wall portion, and a trough extending across the front of the floor between the side walls to receive the water from the gutters and discharge the collected water onto the floor, said trough comprising a straight outer wall, and an inner wall tapered with reference to said outer wall to progressively reduce the sectional area of the trough between the end and middle portions of the trough and cause a uniform distribution of the water for the full extent of the floor.

8. In a spray painting booth of the open front type, side walls, a back wall, a floor sloping towards the back wall, a perforated pipe extending along the top of the side and back walls, means for supplying water to said pipe for providing a curtain of moving water on said walls, an open top gutter mounted on the bottom portion of each side wall near the booth front for collecting water flowing over the respective wall, and a trough extending across the front of the floor between the gutters to receive water from the gutters and distribute the collected water onto the sloping floor, said trough comprising a straight outer wall, and an inner wall having spaced notches in its top edge, said inner wall being tapered progressively with reference to the outer wall from each of its ends adjacent the gutters to the mid-point of the trough between the gutters.

GEORGE P. McGRAW.